Feb. 7, 1933.   B. L. QUARNSTROM   1,896,371
TUBE AND COUPLING
Filed June 27, 1929   2 Sheets-Sheet 1
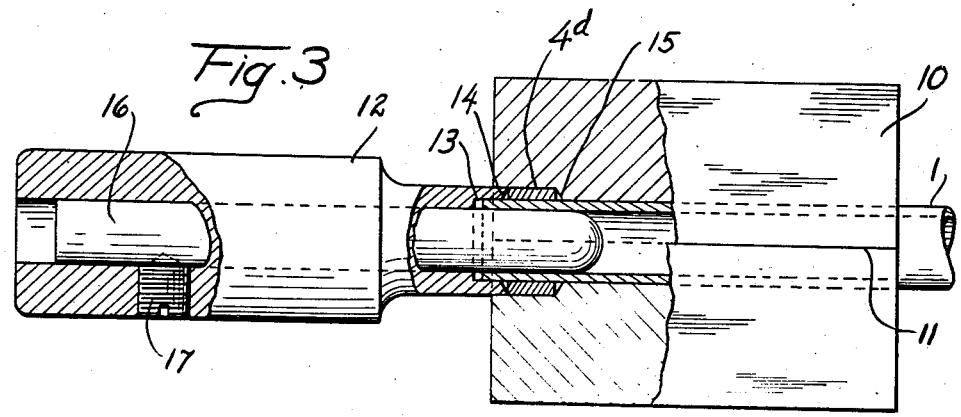
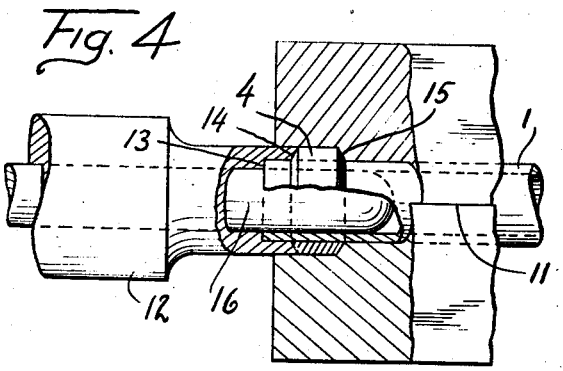
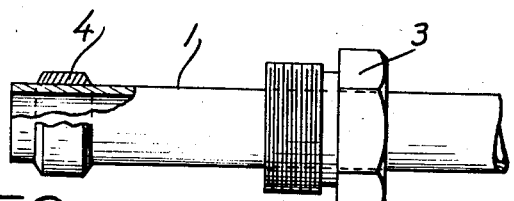
INVENTOR.
Bert L. Quarnstrom
BY
*Stuart C. Barnes*
ATTORNEY.

Feb. 7, 1933.   B. L. QUARNSTROM   1,896,371
TUBE AND COUPLING
Filed June 27, 1929   2 Sheets-Sheet 2

INVENTOR.
Bert L. Quarnstrom
BY
ATTORNEY.

Patented Feb. 7, 1933

1,896,371

UNITED STATES PATENT OFFICE

BERT L. QUARNSTROM, OF GROSSE POINTE PARK, MICHIGAN, ASSIGNOR TO BUNDY TUBING COMPANY, OF DETROIT, MICHIGAN, A CORPORATION OF MICHIGAN

TUBE AND COUPLING

Application filed June 27, 1929. Serial No. 374,059.

This invention has to do with the tubing art, with special reference to relatively small tubes which are used largely as fluid conducting lines, such as gasoline and oil lines in automotive vehicles or other places.

Tubes of this nature are connected to devices, to or from which fluid is conducted, by means of fittings of which there are several types. Such a fitting usually comprises two members which have a screw thread engagement with each other, and into which the end of the tube extends. One of these members is attached to a device such as an engine, gasoline tank, or the like, while the other member fits over the tube. The end of the tube is then disposed within the first mentioned fitting, and the two are drawn together by reason of their screw thread engagement; and between the two members of the fitting there is placed a suitable ring, or sleeve which is tightly engaged between the two members of the fitting as they are drawn together.

It has been the practice to secure the tube to the fittings on the job; that is to say, one member of the fitting which may for convenience be termed a coupling, is previously secured to an instrumentality such as an engine block, gasoline tank, or other device. The other member of the fitting, which may be termed a nut as is also the sleeve, are placed over the tube, and then a connection made between the two fittings by screwing them together. Thus the tube is attached to the fittings, in situ so to speak.

As above mentioned, there are a number of relatively well known commercial fittings. These fittings vary slightly and embody the use of different shaped ring or sleeve members. These sleeves have heretofore been preformed for use with a particular type of fitting.

According to the present invention, the sleeve, together with the nut member of the fitting, is attached to the tube in a permanent manner, and this may be done at a point remote from the location of the assembly of the tube into the mechanism where it is to perform its function, and before such assembly of the tube into the mechanism. Advantageously, the tube, the sleeve, and nut may be assembled together at the plant where the tube is manufactured.

In accordance with the invention, the sleeve is secured to the tube by the employment of considerable pressure so that it clings to the tube securely, and is not displaceable longitudinally of the tube under ordinary conditions of handling and using, so that its position with respect to the end of the tube may be accurately determined and maintained. Moreover, the sleeves, can be given any desired shape so that they can be used with various types of fittings which require different shaped sleeves. Also the sleeve is composed of a relatively ductile metal, so that in its application to the tube, the metal thereof is caused to flow in such a manner as to tightly grip the tube, and to fill external irregularities, crevices, or cracks in the surface of the tube to form a tight joint therewith.

The invention will be better understood when reference is had to the accompanying drawings wherein:

Fig. 1 is a perspective view of a sleeve member prior to its being shaped and placed upon the tube.

Fig. 2 is a side view of the end of a tube showing the sleeve placed thereon, with some parts being shown in section and before the sleeve has been secured to the tube.

Fig. 3 is a view partly in side elevation and partly in section, illustrating a die and punch arrangement for securing the sleeve to the tube.

Fig. 4 is a similar view illustrating the parts after the punch and die have been brought together under pressure.

Figs. 5, 6, 7 and 8 are sectional views taken through various types of fittings which are utilized in securing tubes to devices such as engines, tanks, or the like.

A suitable tube is shown at 1, which may advantageously be relatively small in size, of the type which may be used for fluid conducting lines. Of course, the tube may vary in size, as desired. The tube can be of various constructions; for example, it may be seamless tubing, or on the other hand, it may be a so-called Bundy tube, and it may be here said that although this invention is applicable to all kinds of tubes, it is especially advantageous for use with the Bundy tube.

Figure 5:
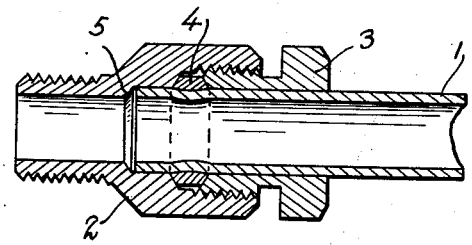
Figure 6:
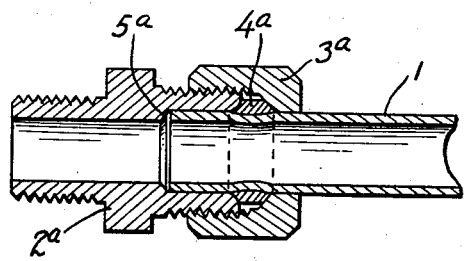
Figure 7:
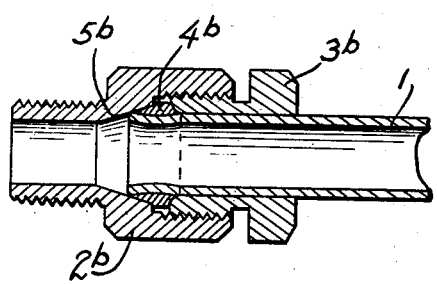
Figure 8:
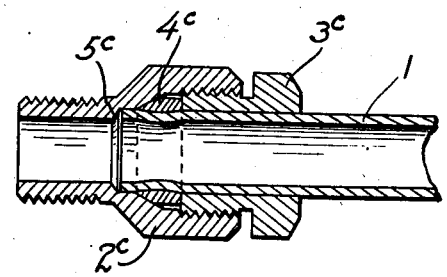

One type of fitting as shown in Fig. 5, includes a coupling member 2 which is screw-threaded for attachment to an engine, tank, or other device, and a nut 3. These two members are screw-threaded together, and between them there is a sleeve 4. Other types of fittings are shown in Figs. 6, 7 and 8, wherein similar parts have applied thereto, reference characters corresponding to the characters applied to the parts in Fig. 5, but identified by the letters $a$, $b$ and $c$.

The primary difference between these several fittings resides in the shape of the fittings and the cross sectional shape of the sleeve or gasket, which is clamped between them. Heretofore, these sleeves were preformed and handled separate of the tube and fitting members prior to attachment; in other words, the attachment to the tube is made by securing the parts 3 and 4 together with the preformed sleeve disposed between them. This was performed on the job, with the part 2 mounted in place. There is no definite or accurate way of ascertaining whether or not the end of the tube is positioned correctly as regards the fitting. In other words, the end of the tube may, or may not, fit up against the shoulders 5, 5$a$ and 5$c$, or be properly positioned as regards the inclined face 5$b$.

In accordance with this invention, the sleeve is permanently secured to the tube, and preferably, at the same time, it is given the desired shape depending upon the type of fitting with which the tube is to be used. This is accomplished by utilizing a sleeve or ring member 4$d$ (Fig. 1), which may have straight, or unformed sides, as illustrated in Fig. 2. This ring or sleeve is made of relatively ductile metal, of which there is a choice of materials, depending upon the desires of the user or the requirements of the job. These sleeves may be made of lead, zinc, aluminum either pure or in alloy, or other alloys, such as an alloy of lead and solder, or the like.

The sleeve 4$d$ is placed upon the tube, as illustrated in Fig. 1, and then the tube and sleeve are placed in a die 10 (Fig. 3), which is preferably split as at 11. When both ends of the tube are to have a sleeve secured thereto, the nut 3, or other type of nut, depending upon the fitting to be used, is first placed over the tube, as illustrated in Fig. 2. A suitable punch 12 is utilized, and which is brought together with the die under pressure, to form the ring 4$d$ into the desired shape. This punch is hollowed out as at 13, to surround the tube, and the working face is suitably shaped as at 14, as is also the working face 15 of the die, to give the desired shape to the sleeve. The punch and die are then brought together under pressure, as illustrated in Fig. 4, thus flowing the metal of the ring and giving the same the desired shape. As shown in the drawings, the punch and die are of the type for providing a sleeve upon the tube, such as the sleeve 4, for use with the type of fitting illustrated in Fig. 5. The working faces of the punch and die can be varied so that the sleeve can be given any desired shape, as for example, the shapes illustrated in Figs. 6, 7 and 8.

Also, it is preferable that a pilot be used, and which moves into the interior of the tube at the time the ring is applied thereto. Such a pilot is illustrated at 16 and it is associated with the punch, the same being hollow for accommodating the pilot, and the two being operably united by set screw 17.

In practice, the rough sleeve 4$d$ is of a size as to nicely fit around the tube. When the punch and die come together, the metal of the sleeve is compressed and tends to flow into any unobstructed opening. Accordingly, the metal will be compressed into, or flow into irregularities, or any uneven surface on the tube so that the ring is tightly clamped to the tube and forms a fluid-tight seal therewith. The sleeve is compressed sufficiently so that it is held tightly to the tube in a permanent manner, to be used or supplied to the trade with the sleeve and nut of the fitting previously attached thereto.

The pilot serves to support the walls of the tube against collapse when the sleeve is attached thereto, and furthermore, serves to true the end of the tube. Sometimes the end of the tube may be slightly out of round, due to having received an impact, or perhaps due to the cutting of the tube; the pilot enters the tube and trues the same into a circle, and then supports it against the exterior pressure during the compression of the sleeve.

The pressure utilized, is sufficient, preferably, to in a slight degree, constrict the tube. This is shown in an exaggerated manner in Figs. 5 to 8. By this arrangement, the connection between the sleeve and the tube is rendered additionally strong.

An advantage of the invention resides in the fact that the sleeve is very accurately spaced from the end of the tube so that the end of the tube comes into positive and correct position as regards the coupling member of the fitting into which it is inserted. In other words, the rings 4, 4$a$, and 4$c$ are so placed upon the tube that the end of the tube to which any one of the sleeves is attached, properly abuts against the shoulder 5, 5$b$, or 5$c$; also the ring 4$b$ is very accurately positioned for cooperation with the surface 5$b$.

Thus, tubes can be supplied by a tube manufacturer to the trade, such as manufacturers of automotive vehicles or other machinery, and these tubes may be previously equipped with a sleeve and nut of the fitting specified by the manufacturer of the automotive vehicle or other machinery. Moreover, the connection is much better and more efficient than where the entire connection is made on the job by merely screwing the two members of the fitting together so as to clamp the sleeve.

I claim:

1. As a new article of manufacture, a tube provided with a relatively ductile metal sleeve relatively permanently and independently mounted thereon adapted to be handled as a single unit, the metal of the ductile sleeve being compressed against the tube and having its ends preshaped for cooperation with male and female coupling members adapted to be screw threaded together and drawn toward each other to abut the opposite preshaped ends of the sleeve for coupling purposes, the portion of the tube immediately underlying the sleeve being substantially undistorted.

2. The method which comprises placing a sleeve of relatively ductile metal over a tube, subjecting the sleeve to pressure axially of the tube to flow the metal thereof to compress the metal of the sleeve against the tube to relatively permanently and independently set the same to the tube, prelocating, the sleeve in a definite position relative to the end of the tube, preshaping the ends of the sleeve by pressure at the time the sleeve is compressed against the tube for cooperation with male and female members of a coupling, and supporting the tube from the interior during the subjecting of the sleeve to pressure to prevent substantial distortion of the tube.

In testimony whereof I affix my signature.

BERT L. QUARNSTROM.